United States Patent
Ito

(10) Patent No.: US 10,280,038 B2
(45) Date of Patent: May 7, 2019

(54) ELEVATOR CONTROL DEVICE

(71) Applicant: MITSUBISHI ELECTRIC CORPORATION, Chiyoda-ku (JP)

(72) Inventor: Takahiro Ito, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 92 days.

(21) Appl. No.: 15/516,947

(22) PCT Filed: Jan. 13, 2015

(86) PCT No.: PCT/JP2015/000104
§ 371 (c)(1),
(2) Date: Apr. 5, 2017

(87) PCT Pub. No.: WO2016/113769
PCT Pub. Date: Jul. 21, 2016

(65) Prior Publication Data
US 2017/0297859 A1    Oct. 19, 2017

(51) Int. Cl.
| | | |
|---|---|---|
| B66B 1/28 | (2006.01) | |
| H02P 5/00 | (2016.01) | |
| B66B 1/30 | (2006.01) | |
| H02P 23/20 | (2016.01) | |
| H02P 23/12 | (2006.01) | |

(52) U.S. Cl.
CPC ............ B66B 1/30 (2013.01); H02P 23/12 (2013.01); H02P 23/20 (2016.02); H02P 2205/07 (2013.01)

(58) Field of Classification Search
CPC . B66B 1/30; H02P 23/12; H02P 23/20; H02P 2205/07

USPC ......................................................... 187/293
See application file for complete search history.

(56) References Cited

U.S. PATENT DOCUMENTS

| | | | | |
|---|---|---|---|---|
| 9,546,074 | B2 * | 1/2017 | Okamoto | ................. B66B 5/04 |
| 2012/0061187 | A1 | 3/2012 | Kato | |
| 2013/0018639 | A1 * | 1/2013 | Sakai | ..................... B66B 1/285 |
| | | | | 703/2 |
| 2013/0126276 | A1 * | 5/2013 | Hirabayashi | .............. B66B 1/30 |
| | | | | 187/293 |

(Continued)

FOREIGN PATENT DOCUMENTS

| | | |
|---|---|---|
| JP | 2009-113979 A | 5/2009 |
| WO | 2010/143257 A1 | 12/2010 |
| WO | 2011/108047 A1 | 9/2011 |

OTHER PUBLICATIONS

International Search Report dated Apr. 21, 2015 in PCT/JP2015/000104 filed Jan. 13, 2015.

*Primary Examiner* — Jeffrey Donels
(74) *Attorney, Agent, or Firm* — Xsensus LLP

(57) ABSTRACT

An elevator control device includes a filter to remove a direct current component and a torque component derived from rope imbalance from a torque command value applied to a drive motor, and an inertia identifying mechanism to identify an inertia value of an elevator based on an output obtained when a speed detection signal is input into the filter, and an acceleration converting mechanism, which are connected in series, and an output obtained when the torque command value is input into the filter. As a result, the inertia value of a high-lift elevator can be calculated accurately.

12 Claims, 8 Drawing Sheets

(56) References Cited

U.S. PATENT DOCUMENTS

2013/0146397 A1* 6/2013 Lee .......................... B66B 1/30
　　　　　　　　　　　　　　　　　　　　　　187/247
2015/0353323 A1* 12/2015 Shiraishi ................... B66B 5/04
　　　　　　　　　　　　　　　　　　　　　　187/266

* cited by examiner

ELEVATOR CONTROL DEVICE

TECHNICAL FIELD

This invention relates to an elevator control device.

BACKGROUND ART

In a conventional elevator control device, first, an acceleration torque command value is extracted by removing load torque and loss torque components, which are considered to be constant, from a torque command value applied to a motor during car travel using a band pass filter as filtering means. Next, a first inertia value of the elevator is calculated on the basis of the acceleration torque command value and a speed detection value, and then a control parameter of a control device is corrected and calculations are performed using the first inertia value (see PTL 1, for example).

CITATION LIST

Patent Literature

[PTL 1] Japanese Patent No. 5298506

SUMMARY OF INVENTION

Technical Problem

However, when this conventional elevator control device is applied to an elevator system used in a high-rise building, it is difficult to obtain an accurate inertia value of the elevator due to the effect of rope imbalance. Rope imbalance is a weight difference between the weight of a rope on the car side and the weight of the rope on a counter weight side. The value of the rope imbalance is dependent on a difference in the length of the rope between the car side and the counter weight side, and therefore varies according to the position of the car during car travel. For example, when the car is on a lowermost floor, substantially the entire rope load is exerted on the car side as the rope imbalance, and when the car is on an uppermost floor, substantially the entire rope load is exerted on the counter weight side as the rope imbalance. When the car is in the vicinity of an intermediate position, meanwhile, the rope imbalance reaches zero.

Hence, the torque command value of the motor is affected by the rope imbalance even when the car travels at a constant speed, and therefore varies in accordance with the position of the car during car travel rather than taking a constant value. More specifically, a temporal waveform of the torque command value of the motor while the car travels at a constant speed is a rectilinear temporal waveform having a certain incline, and therefore cannot easily be considered constant.

Furthermore, in the conventional elevator control device, the filtering means is used to remove the load torque and loss torque components, which are considered to be constant, from the torque command value applied to the motor during car travel, and it is therefore difficult to remove a torque component that is not constant due to the effect of the rope imbalance. As a result, a problem occurs in that the inertia value of the elevator cannot be calculated accurately due to the effect of the rope imbalance. Moreover, since the inertia value of the elevator cannot be calculated accurately, a favorable control characteristic (a following characteristic relative to a speed command value, for example) is not exhibited by the elevator control device when applied to an elevator used in a high-rise building where problems occur due to the rope imbalance.

Note that in this specification, the inertia of the elevator is assumed to indicate the inertia of the entire elevator as seen from the motor.

This invention has been designed to solve the problems described above, and an object thereof is to obtain an elevator control device that can accurately calculate an inertia value of an elevator, particularly an elevator (referred to hereafter as a high-lift elevator) used in a high-rise building where problems occur due to rope imbalance.

Solution to Problem

An elevator control device according to this invention includes: a motor that generates torque for causing a car of an elevator to ascend and descend; speed command generating means for generating a speed command value of the motor; speed detecting means for detecting a speed of the motor; torque command generating means for generating a torque command value on the basis of the speed command value and a speed value detected by the speed detecting means; torque controlling means for controlling the motor so that a value of the torque generated by the motor matches the torque command value; and inertia calculating means for calculating an inertia value of the elevator on the basis of the torque command value and the speed value detected by the speed detecting means, the inertia calculating means including: filtering means for removing a direct current component and a torque component derived from rope imbalance from a temporal waveform of the torque command value; acceleration converting means for converting a temporal waveform having a speed dimension into a temporal waveform having an acceleration dimension; and inertia identifying means for identifying the inertia value of the elevator on the basis of an output obtained when a temporal waveform of the speed value detected by the speed detecting means is input into the acceleration converting means and the filtering means, which are connected in series, and an output obtained when the temporal waveform of the torque command value is input into the filtering means.

Advantageous Effects of Invention

In the elevator control device according to this invention, the filtering means having a frequency characteristic for removing the direct current component and the torque component derived from the rope imbalance from the torque command value, the acceleration converting means for converting a speed signal into an acceleration signal, and the inertia identifying means for identifying the inertia value of the elevator on the basis of the output obtained when a detection signal from the speed detecting means is input via the acceleration converting means and the filtering means, which are connected in series, and the output obtained when the torque command value is input into the filtering means are provided as the inertia calculating means, and therefore, even when calculating the inertia value of a high-lift elevator in which problems occur due to the rope imbalance, an acceleration torque component can be extracted appropriately from the torque command value, with the result that the inertia value of the elevator can be calculated accurately.

Moreover, by performing calculations after correcting a control parameter of the control device using the calculated inertia value, a favorable control characteristic, for example a following characteristic of the elevator control device relative to the speed command value, can be obtained.

Note that in this specification, priority is given to describing the effect of the rope imbalance in an easy to understand manner, and therefore aspects in which a compensating rope (or a weight compensating rope) such as that disclosed in Japanese Patent Application Publication S57-57172 is not used in the elevator mechanical system will be described. A compensating rope compensates as far as possible for rope imbalance. However, it is very difficult to prepare compensating ropes of an extremely large number of types in order to be able to respond to elevator mechanical systems of various specifications. As already disclosed in Japanese Patent Application Publication S57-57172, therefore, it is well known that realistically, even when a compensating rope is used, the compensating rope cannot sufficiently compensate for the rope imbalance, and as a result, the effect of the rope imbalance cannot be eliminated. It may therefore be said that the problem occurring in the prior art, i.e. that the inertia value of the elevator cannot be calculated accurately due to the effect of the rope imbalance, applies likewise to a case in which a compensating rope is used. In other words, the elevator control device according to this invention is effective regardless of whether or not a compensating rope is used in the elevator mechanical system, and therefore the effects described above are obtained.

DESCRIPTION OF EMBODIMENTS

Embodiments of this invention will be described below with reference to the drawings.

First Embodiment

FIGS. 1 to 5 relate to a first embodiment of this invention.

First, a configuration of an elevator control device according to the first embodiment of this invention will be described.

Figure 1:
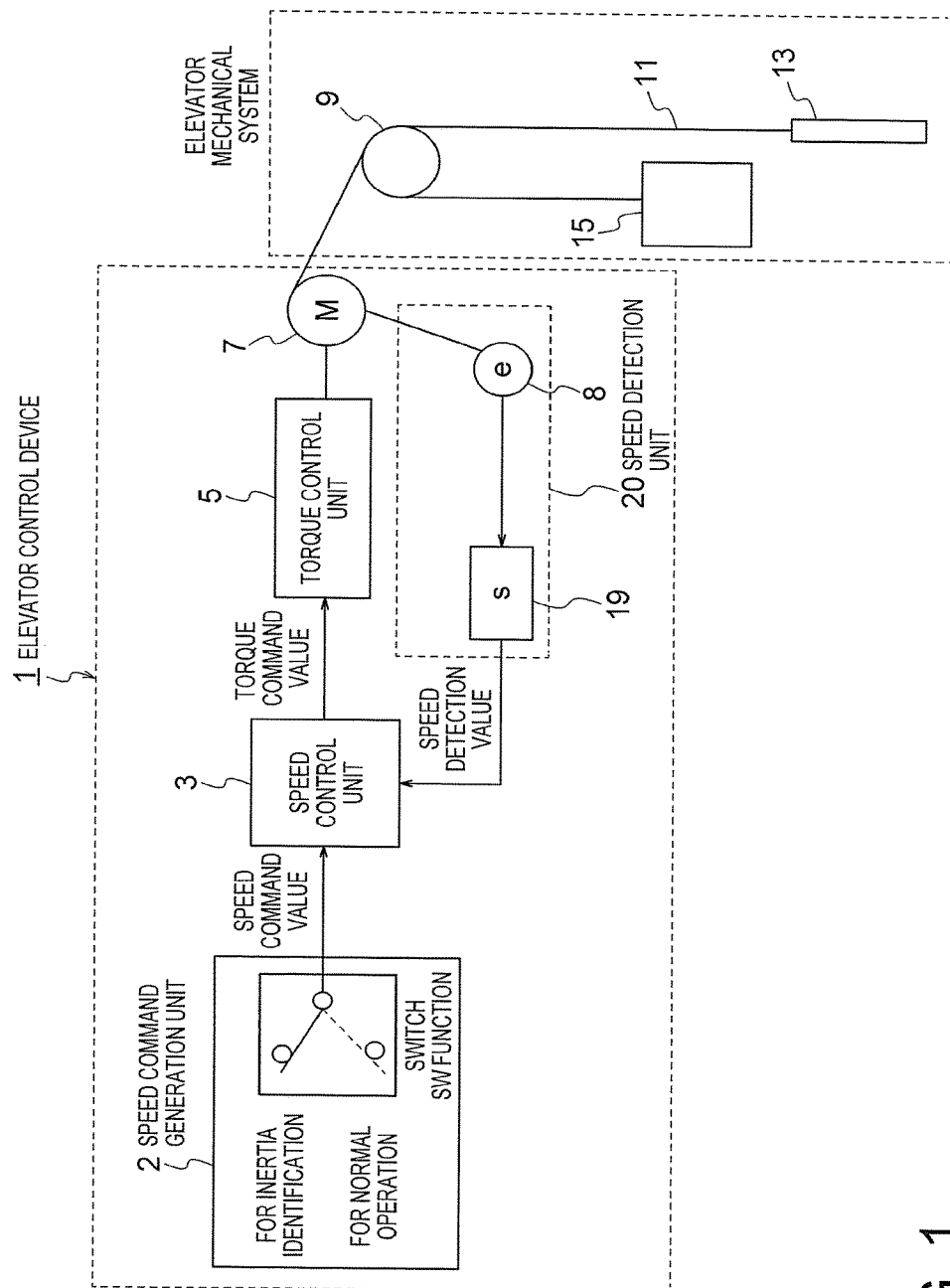
FIG. 1 is an overall view of an elevator system including an elevator control device according to first and second embodiments of this invention.

In FIG. 1, an elevator control device 1 uses a speed control unit 3 to generate a torque command value in accordance with a speed command value of a motor, generated by a speed command generation unit 2, and drive-controls a motor 7 via a torque control unit 5 on the basis of the torque command value.

The motor 7 is configured to drive a sheave 9 to rotate, and a rope 11 is wound around a groove in the sheave 9. A car 15 is fixed to one end of the rope 11, and a counterweight 13 is fixed to the other end. Here, the sheave 9, the rope 11, the car 15, and the counter weight 13 together constitute an elevator mechanical system, and these components are drive-controlled by the elevator control device 1. The elevator mechanical system and the elevator control device 1 together constitute an overall elevator system.

The elevator control device 1 further includes a speed detection unit 20 that detects a rotation position of the motor 7 and generates a speed detection value. The speed detection unit 20 includes an encoder 8 that generates a position detection value, and a differentiator 19 that outputs a speed detection value to be input into the speed control unit 3 on the basis of the output of the encoder 8.

Figure 2:
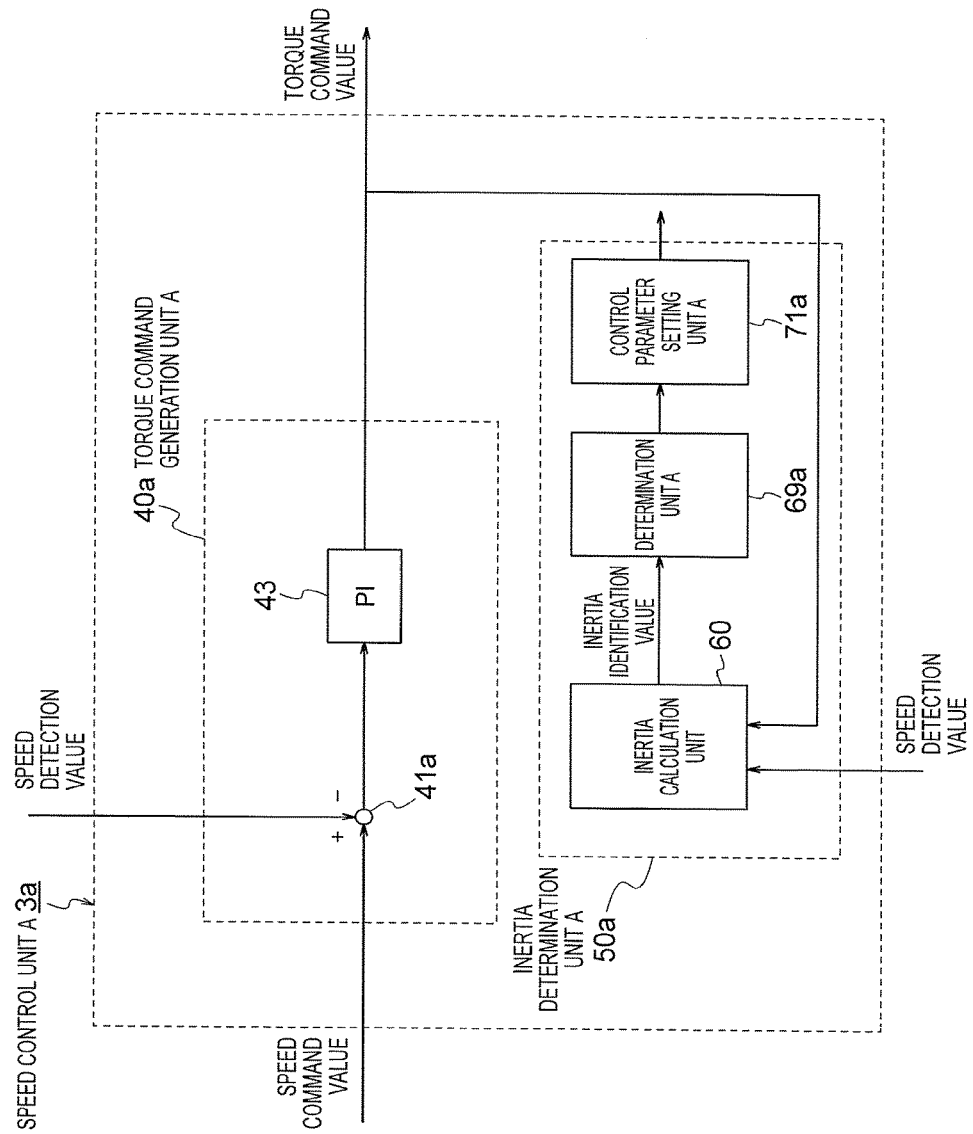
FIG. 2 is a view showing an internal configuration of a speed control unit of the elevator control device according to the first embodiment of this invention.

In FIG. 2, a speed control unit A 3a serving as a specific example of the speed control unit 3 includes a torque command generation unit A 40a that generates a torque command value using the speed command value and the speed detection value as input, and an inertia determination unit A 50a that determines inertia.

The torque command generation unit A 40a includes a second subtractor A 41a that determines a first speed deviation value by subtracting the speed detection value from the speed command value, and a PI controller 43 that determines the torque command value using the first speed deviation value as input.

The inertia determination unit A 50a includes an inertia calculation unit 60, a determination unit A 69a, and a control parameter setting unit A 71a.

The inertia calculation unit 60 determines an inertia identification value using the speed detection value and the torque command value as input. The determination unit A 69a determines whether or not the inertia identification value determined by the inertia calculation unit 60 is an appropriate value, and then confirms and outputs the appropriate inertia identification value. The control parameter setting unit A 71a sets a control parameter of the elevator control device appropriately using the appropriate inertia identification value confirmed by the determination unit A 69a.

The elevator control device 1 performs calculations using the control parameter set by the control parameter setting unit A 71a. Here, the control parameter is a gain of the PI controller 43 provided in the torque command generation unit A 40a, for example.

Note that the control parameter setting unit A 71a sets a value of the gain of the PI controller 43 in consideration of the appropriate inertia identification value confirmed by the determination unit A 69a so that an open loop transfer characteristic of the speed control system (or a control band of the speed control system), for example, matches a design value.

Further, in an initial condition where an appropriate inertia identification value does not exist, the control parameter setting unit A 71a sets the value of the gain of the PI controller 43 using an inertia value calculated from results of a design study conducted with respect to a mechanical structure, for example, so that the open loop transfer characteristic of the speed control system matches the design value, as described above.

Figure 3:
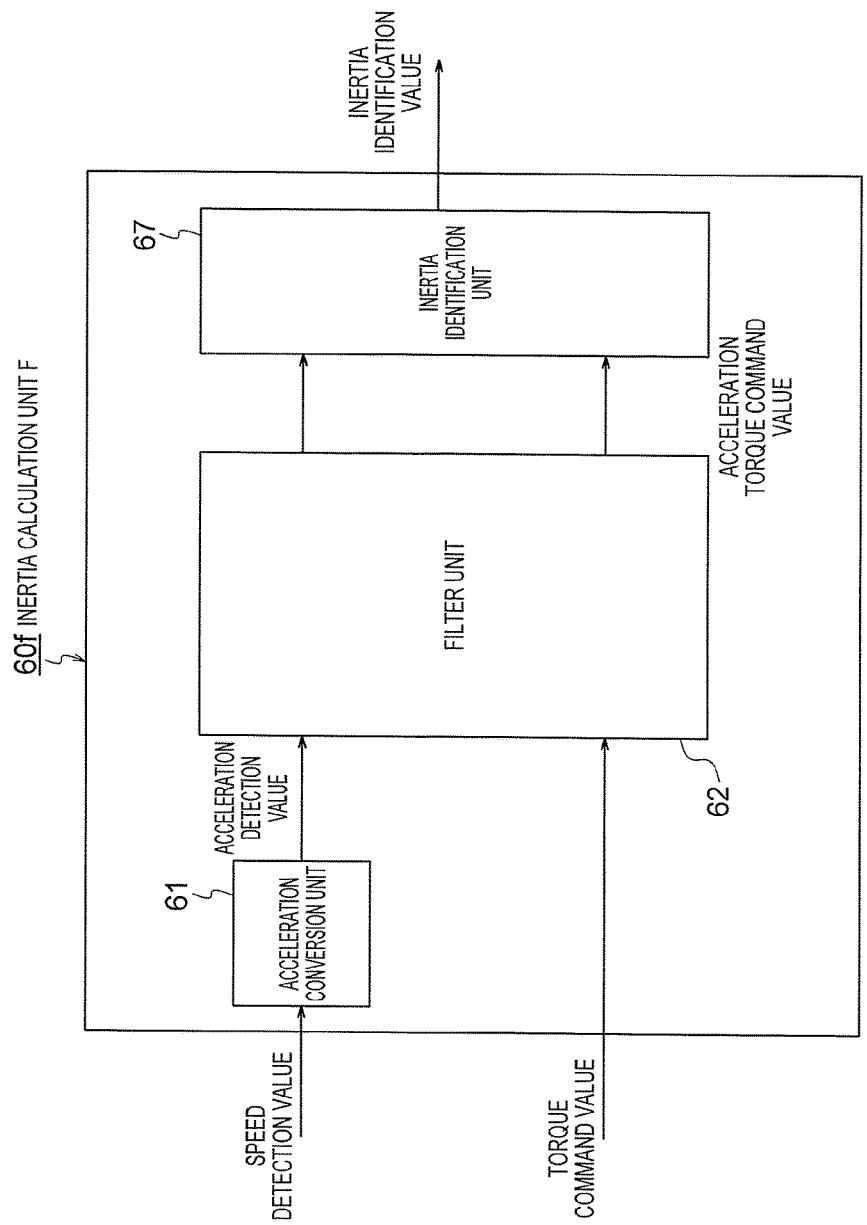
FIG. 3 is a view showing an internal configuration of an inertia calculation unit of the elevator control device according to the first and second embodiments of this invention.

In FIG. 3, an inertia calculation unit F 60f serving as a specific example of the inertia calculation unit 60 includes an acceleration conversion unit 61, a filter unit 62, and an inertia identification unit 67.

The acceleration conversion unit 61 determines an acceleration detection value using the speed detection value as input. The filter unit 62 has a frequency characteristic with which an acceleration torque command value can be extracted by removing a direct current component and a torque component derived from rope imbalance from the torque command value, and therefore filters the acceleration detection value and the torque command value on the basis of this frequency characteristic using the acceleration detection value and the torque command value as input. The inertia identification unit 67 determines the inertia identification value on the basis of the output of the filter unit 62 when the acceleration detection value is input therein and the acceleration torque command value (the output of the filter unit 62 when the torque command value is input therein).

Note that here, the acceleration torque command value is a command value of an acceleration torque Ta shown below in Expression (1).

Further, it is stated here that the acceleration conversion unit 61 "determines the acceleration detection value using the speed detection value as input", but this statement may be rewritten more accurately as "determines a temporal waveform of the acceleration detection value using a temporal waveform of the speed detection value as input".

Likewise in relation to other statements provided in the body of the specification, the term "temporal waveform" will be omitted wherever the intended meaning is obvious on the basis of technical common knowledge.

Figure 4:
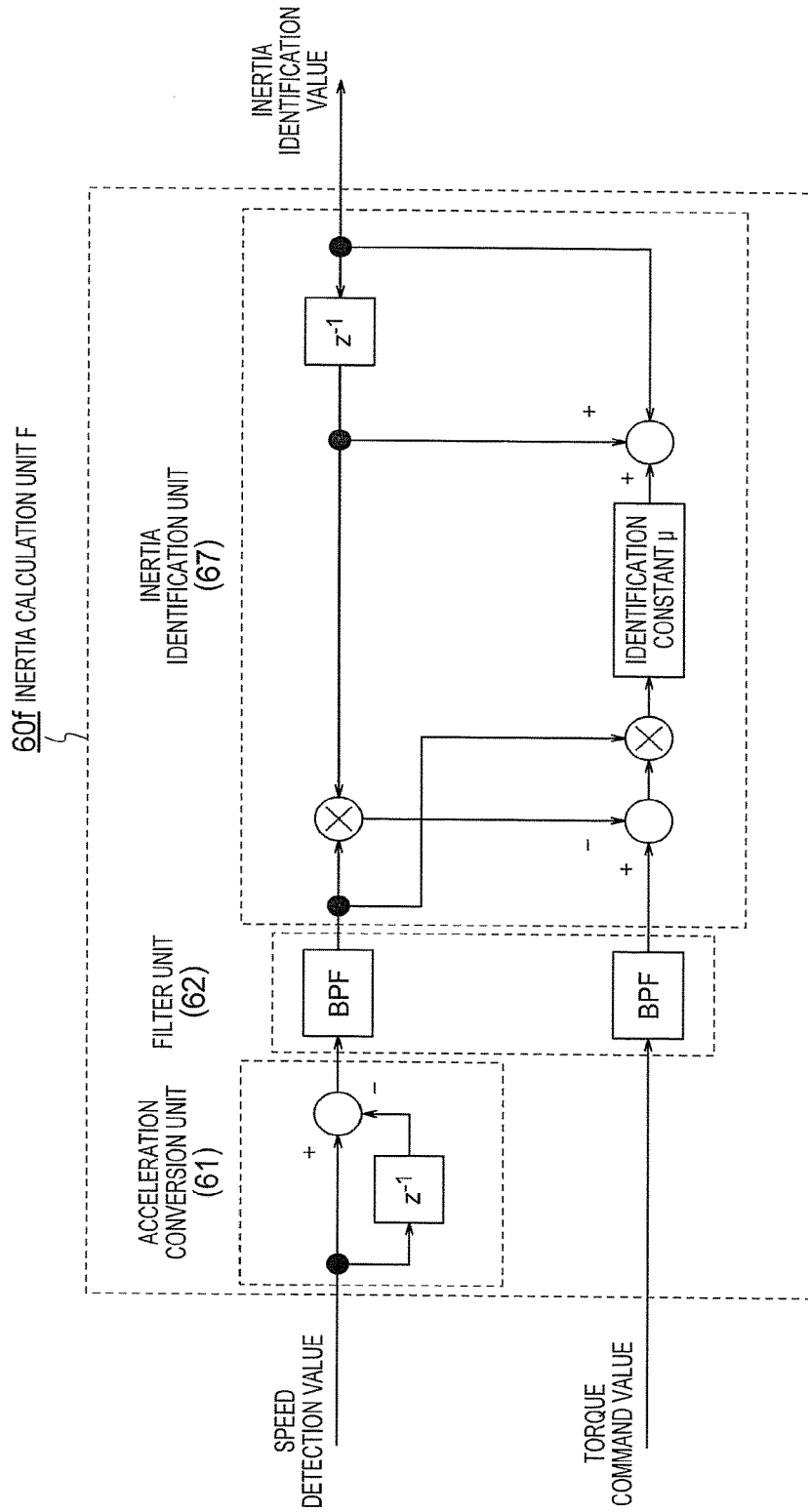
FIG. 4 is a view showing a specific example of calculation processing executed in the interior of the inertia calculation unit shown in FIG. 3.

FIG. 4 shows a specific example of specific calculation processing executed in the interior of the inertia calculation unit F 60f shown in FIG. 3. In the example described here, the calculation processing is realized by digital computation, and can therefore be expressed using an operator z. More accurately, the calculation processing can be expressed using $z^{-1}$, which is a delay operator constituted by the inverse of the operator z.

The acceleration conversion unit 61 is realized by digital computation in which a differential operation is performed.

The filter unit 62 may be constituted only by a high pass filter (HPF) that removes the direct current component and the torque component derived from the rope imbalance from the torque command value, but FIG. 4 shows an example in which the filter unit 62 is constituted by a band pass filter (BPF) formed by connecting in series a high pass filter (HPF) and a low pass filter (LPF) used to remove general noise. Note that the content of the digital computation performed by the filter unit 62 using the operator z will not be described in detail.

The inertia identification unit 67 is realized by digital computation representing a recurrence relation of J[n], as expressed below in Expression (12). In other words, the inertia identification unit 67 successively outputs J[n], which is calculated digitally as an inertia identification value on the basis of Expression (12). It is therefore necessary to confirm the appropriate inertia identification value on the basis of successively output J[n]. Confirmation of the appropriate inertia identification value is realized by the determination unit A 69a shown in FIG. 2.

For example, the determination unit A 69a determines that the inertia identification value has converged when a convergence determination expression shown below in Expression (13) is satisfied four times in a row. The determination unit A 69a then confirms and outputs the converged value as the appropriate inertia identification value. The convergence determination expression will be described again below using FIG. 5.

Figure 5:
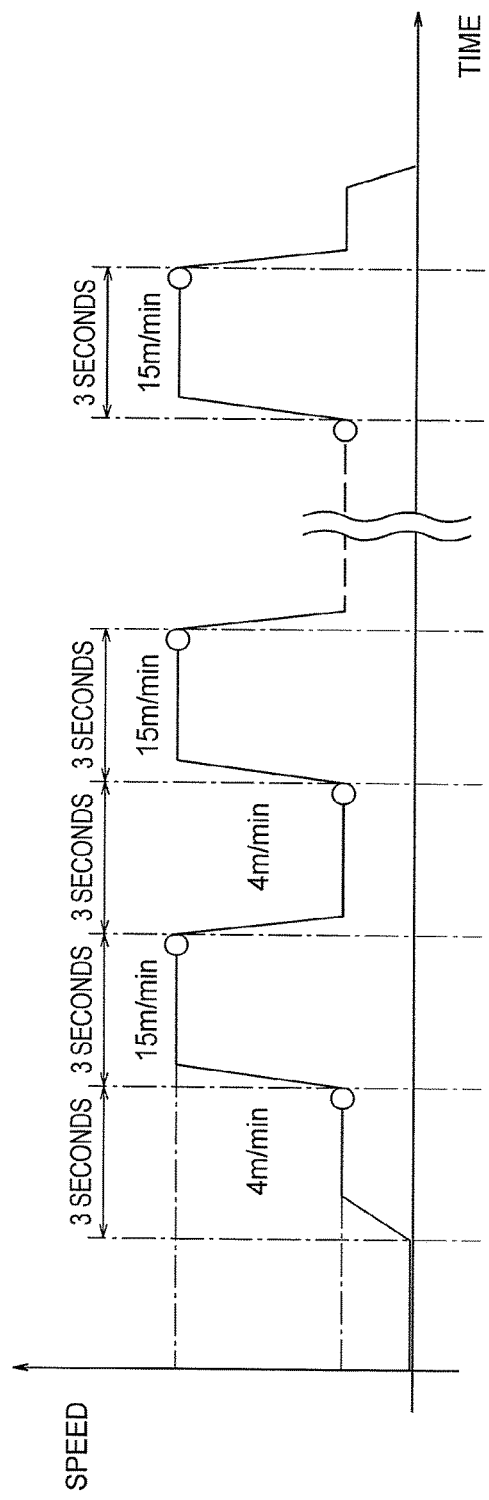
FIG. 5 is a view showing an example of a temporal waveform (for identifying inertia) of a speed command value of the elevator control device according to the first and second embodiments of this invention.

FIG. 5 shows an example of a temporal waveform of the speed command value that is applied to the motor in order to identify the inertia.

A temporal waveform obtained during a single normal travel operation by the car, such as that disclosed in PTL 1, may of course be used by the elevator control device according to the first embodiment of this invention as the speed command value for identifying the inertia. However, to achieve a further improvement in the precision with which the inertia is identified, it is more effective to use the inertia identifying speed command value shown in FIG. 5, as will be described below.

As shown in FIG. 1, the speed command generation unit 2 for generating the speed command value of the motor is capable of switching between the inertia identifying speed command value and a normal operation speed command value, and outputs the speed command value of the motor by switching between these speed command values on the basis of whether an inertia identification operation or a normal operation is underway.

Here, as is well known, the normal operation speed command value has a trapezoidal temporal waveform including an acceleration zone, a constant speed zone, and a deceleration zone. The inertia identifying speed command value, on the other hand, as shown in FIG. 5, features a temporal waveform that alternates between a first speed value and a second speed value having identical signs but different magnitudes. Note that FIG. 5 shows an example of an inertia identifying speed command value having a temporal waveform that alternates every 3.0 sec between speed values having two magnitudes, namely 4 m/min and 15 m/min.

In FIG. 5, circle marks denote respective timings at which the inertia identification value J[n] determined on the basis of Expression (12), to be described below, is stored in a storage unit, not shown in the drawings, and convergence thereof is determined by applying the convergence determination expression shown in Expression (13), to be described below. An interval between these timings is set to be longer than a sampling time at which the inertia identification unit 67 implements the calculations of Expression (12).

The configuration of the elevator control device according to the first embodiment of this invention was described above using FIGS. 1 to 5.

The elevator control device according to the first embodiment of this invention includes the following two features.

A first feature is that the elevator control device includes, as a main configuration, filtering means for removing the direct current component and the torque component derived from the rope imbalance from the torque command value applied to the motor, and inertia identifying means for identifying the inertia value of the elevator on the basis of an output obtained when a speed detection signal is input into the filtering means and acceleration converting means, which are connected in series, and the output obtained when the torque command value is input into the filtering means.

A second feature is that inertia identification is implemented using a speed command value featuring a temporal waveform that alternates between a first speed value and the second value having identical signs but different magnitudes.

First, therefore, with respect to the first feature, a reason why the inertia identification unit 67 can determine the inertia identification value on the basis of the acceleration torque command value and the output obtained when the acceleration detection value is input into the filter unit 62, as shown in FIG. 3, will be described below in section [1].

Next, with respect to the second feature, a reason why the precision with which the inertia is identified can be improved by employing the temporal waveform of the inertia identifying speed command value shown in FIG. 5 will be described below in section [2].

[1] Inertia Identification by Inertia Identification Unit 67

The reason why the inertia identification unit 67 can determine the inertia identification value on the basis of the acceleration torque command value and the output obtained when the acceleration detection value is input into the filter unit 62 will now be described using FIG. 3.

First, a motor torque T, when separated into an acceleration torque Ta that is commensurate with the acceleration, a load torque TL that is commensurate with the load and the rope imbalance condition, and a loss torque Th that is commensurate with the speed, can be expressed as shown in Expression (1).

$$T = Ta + TL + Th \quad (1)$$

Further, the acceleration torque Ta can be expressed as shown in Expression (2).

$$Ta = J \times (d\omega/dt) \quad (2)$$

where J is the inertia of the entire elevator (the elevator inertia) as seen from the motor, ω is an angular velocity (a motor rotation angle velocity), and d/dt is a differential operator.

Figure 8:
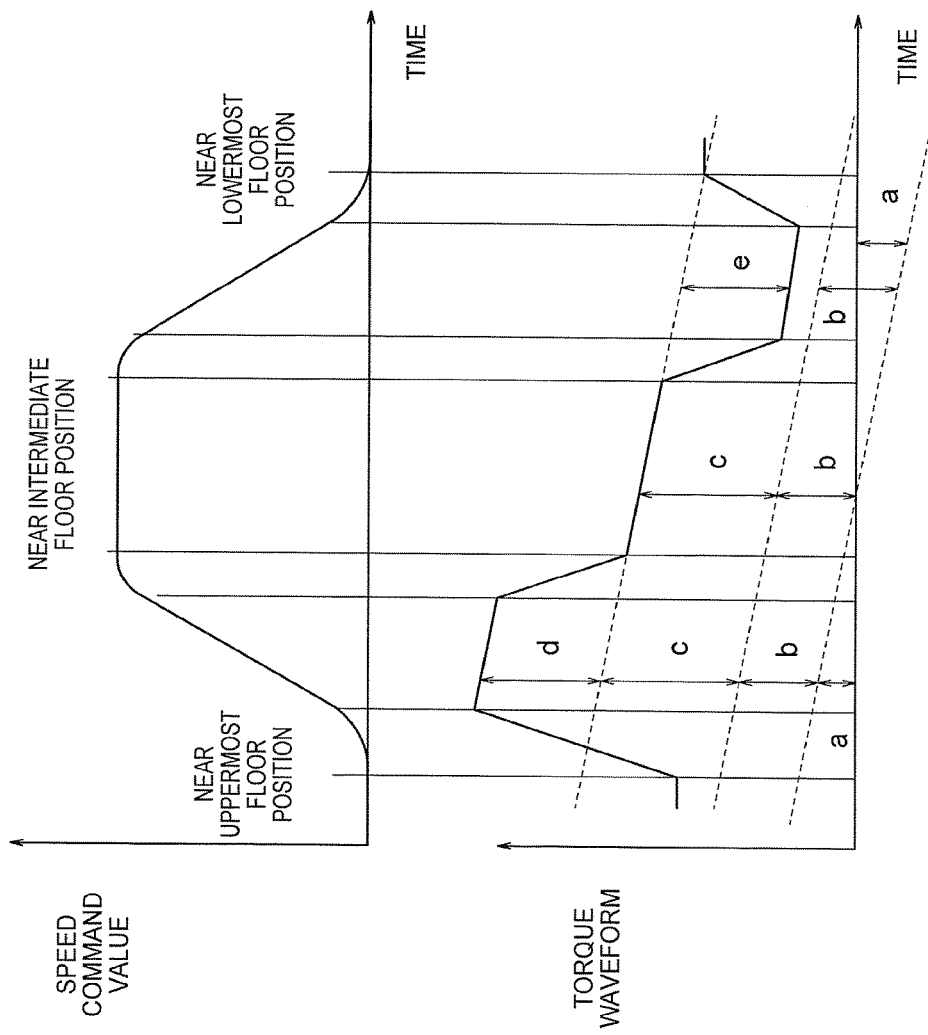
FIG. 8 is a view showing a speed command value and a torque waveform (a torque command value) generated during normal travel by a high-lift elevator that uses a typical elevator control device.

Next, using FIG. 8, the various torque components of Expression (1), namely the acceleration torque Ta, the load torque TL that is commensurate with the load and the rope imbalance condition, and the loss torque Th that is commensurate with the speed, will be examined in detail.

More accurately, FIG. 8 shows the speed command value and a torque waveform (the torque command value) in a case where a high-lift elevator employing a typical elevator control device travels without passengers from an uppermost floor to a lowermost floor. Here, as long as the torque control unit 5 of the elevator control device is in a favorable operating condition, the temporal waveform of the torque (generated torque) generated by the motor follows the torque command value, and it is therefore evident that the torque command value and the torque waveform match. Accordingly, the ordinate of the graph in the lower part of FIG. 8 shows the torque waveform (the torque command value).

On the graph in the lower part of FIG. 8, a corresponds to a rope imbalance component, b corresponds to a loss torque component, c corresponds to an imbalance component between the weight of the car and the weight of the counterweight, d corresponds to an acceleration torque component generated during acceleration, and e corresponds to an acceleration torque component generated during deceleration.

Note that the rope imbalance and the imbalance between the weight of the car and the weight of the counter weight together constitute the load torque TL.

Features of the various components of the torque command value (the torque waveform) are as described below.

(1) Rope Imbalance Component

As is evident from the graph in the lower part of FIG. 8, the rope imbalance component indicated by a has an inclined temporal waveform (with different signs in an ascending direction and a descending direction) when the car travels at a constant speed, and is therefore not constant. Note that in the drawing, the rope imbalance is positive when the car is above an approximatelys intermediate position and negative when the car is below the approximately intermediate position.

(2) Loss Torque Component: Th

The loss torque component indicates loss that is commensurate with the speed, and is generated due to loss between a rail and the guide, loss between the rope and the sheave, loss between the rope and a return wheel, and so on, for example. The loss torque component is designed to be sufficiently small in terms of the mechanical design of the elevator system, and therefore the magnitude thereof within the torque command value is considerably smaller than the magnitude of the acceleration torque.

(3) Imbalance Component between Weight of Car and Weight of Counter Weight

Regarding the imbalance component between the weight of the car and the weight of the counter weight, the weight of the counter weight is typically determined such that weight balance is achieved between the car side and the counter weight side when an in-car load is set at half (a half load of) a maximum carrying weight of the car. In FIG. 8, therefore, which shows travel without passengers, the weight imbalance between the car side and the counter weight side may be considered to be a fixed value corresponding to half the load (a half load) of the maximum carrying weight of the car.

(4) Acceleration Torque: Ta

As shown in Expression (2), the magnitude of the acceleration torque is determined in proportion to the magnitude of the angular acceleration of the motor, and since the angular acceleration takes a sign, the acceleration torque in FIG. 8 takes a positive value during acceleration and a negative value during deceleration.

In the conventional elevator control device disclosed in PTL 1, it is assumed that while the car travels, the load torque TL and the loss torque Th may be considered constant, and therefore the inertia value of the elevator is determined using a filter unit that extracts an acceleration torque command value by removing the load torque and the loss torque, which are considered to be constant, from the torque command value.

As described above in relation to the background art, therefore, when the conventional elevator control device is applied to a high-lift elevator that is affected by the rope imbalance, which cannot be considered constant while the car travels, it is difficult to obtain an accurate inertia value of the elevator due to the effect of the rope imbalance. Hence, the control parameter of the control device is determined and control is implemented without the use of an appropriate inertia value, and as a result, a favorable control characteristic (a following characteristic relative to the speed command value, for example) cannot be obtained in the elevator control device.

The elevator control device 1 according to the first embodiment of this invention, on the other hand, extracts predetermined frequency components from the acceleration detection value and the torque command value by applying the filter unit 62, which removes the direct current component and the torque current generated by the rope imbalance from the torque command value, to each of the accelerator detection value and the torque command value, and then determines the inertia value of the elevator using the inertia identification unit 67 on the basis of the respective outputs from the filter unit 62.

Here, when the respective filter units of the conventional elevator control device and the elevator control device according to the first embodiment of this invention are compared, two differences clearly exist therebetween.

<1> The torque component derived from the rope imbalance cannot be removed by the filter unit of the former (the conventional elevator control device), but can be removed by the filter unit of the latter (the elevator control device according to the first embodiment of this invention), and therefore the respective filter units of the two devices have different frequency characteristics.

<2> Further, the filter unit of the former is applied only to the torque command value and not to the acceleration detection value, whereas the filter unit of the latter is applied to both the acceleration detection value and the torque command value, and therefore the respective filter units of the two devices have different application configurations.

Due to the two differences described in sections <1> and <2>, the elevator inertia values determined respectively by the conventional elevator control device and the elevator control device according to the first embodiment of this invention differ in precision.

Hence, the manner in which the inertia identification unit 67 determines an elevator inertia identification value for a high-lift elevator will be described below with the use of mathematical expressions, focusing on the filter unit 62 of the elevator control device according to the first embodiment of this invention.

Note that in actuality, the elevator control device is realized by digital control, and should therefore be described strictly as a discrete time system that uses an operator z. Here, however, priority is given to facilitating understanding while maintaining accuracy, and therefore the elevator control device will be described as a continuous time system. For the same reason, the elevator control device will also be described as a linear system. Moreover, if necessary, a line of thinking that accords with a mathematical operator method will be adopted when transforming mathematical expressions.

The torque waveform (the torque command value) T can be expressed as shown below in Expression (3) on the basis of Expressions (1) and (2).

$$T = J \times (d\omega/dt) + TL + Th \quad (3)$$

Next, by expressing a transfer characteristic within a Laplace domain of the filter unit 62 of the elevator control device 1 according to the first embodiment of this invention as a function H1 and applying H1 to the left side and the right side of Expression (3), Expression (4), shown below, can be obtained.

$$H1(T) = H1(J \times (d\omega/dt) + TL + Th) \quad (4)$$

Here, H1( ) denotes the output obtained when the filter H1 is applied to a signal within the parentheses.

Furthermore, when the associative law and the distributive law of the linear system are applied to Expression (4), Expressions (5), (6), and (7), shown below, are obtained.

$$H1(T) = H1(J \times (d\omega/dt)) + H1(TL) + H1(Th) \quad (5)$$

$$H1(T) = J \times H1(d\omega/dt) + H1(TL) + H1(Th) \quad (6)$$

$$= J \times d(H1(\omega))/dt + H1(TL) + H1(Th) \quad (7)$$

As regards the load torque TL including the rope imbalance component and the imbalance component between the weight of the car and the weight of the counter weight, in a high-lift elevator having a long elevation stroke in particular, the rope lengthens in accordance with the elevation stroke, leading to an increase in the effect of the rope imbalance component, and as a result, as described above, the rope imbalance is not constant.

Once again, therefore, it is difficult to remove the inconstant rope imbalance component with a filter unit that removes only the direct current component, such as that used in the conventional elevator control device.

As H1( ), the elevator control device according to the first embodiment of this invention employs a band pass filter (BPF) having a frequency characteristic with which the effect of a rope imbalance component that is inclined when the car travels at a constant speed can be removed sufficiently in addition to the direct current component. In other words, a break frequency of the high-pass filter (HPF) forming a part of the band pass filter (BPF) is considerably higher than the characteristic of the filter unit used in the conventional elevator control device.

As illustrated by (H1 (TL)+H1 (Th)) on the right side of Expression (6) or Expression (7), therefore, with the elevator control device according to the first embodiment of this invention, by applying the filter unit 62, the effect of the load imbalance component can be reduced gradually to zero even in a high-lift elevator having a long elevation stroke.

Accordingly, $$H1(T) = J \times H1(d\omega/dt) \quad (8)$$

$$= J \times d(H1(\omega))/dt \quad (9)$$

Further, Expressions (10) and (11), shown below, are obtained from Expressions (8) and (9).

$$J = H1(T)/(H1(d\omega/dt)) \quad (10)$$

$$= H1(T)/(d(H1(\omega))/dt) \quad (11)$$

Note that this excludes a case in which the value of the denominator in Expression (10) or Expression (11) is zero.

In Expression (10), the numerator denotes the filtered torque command value, and the denominator denotes the filtered acceleration detection value.

In Expression (11), meanwhile, the numerator likewise denotes the filtered torque command value, while the denominator denotes a differentiated value of the filtered speed detection value. In other words, the difference between Expression (10) and Expression (11) is that in the former (Expression (10)), the denominator is obtained by filtering the differentiated speed detection value, whereas in the latter (Expression (11)), the denominator is obtained by differentiating the filtered speed detection value.

Hence, Expression (10) corresponds to the view of the internal configuration of the inertia calculation unit shown in FIG. 3, while Expression (11) corresponds to the view of the internal configuration of the inertia calculation unit shown in FIG. 7, to be described below.

Figure 7:
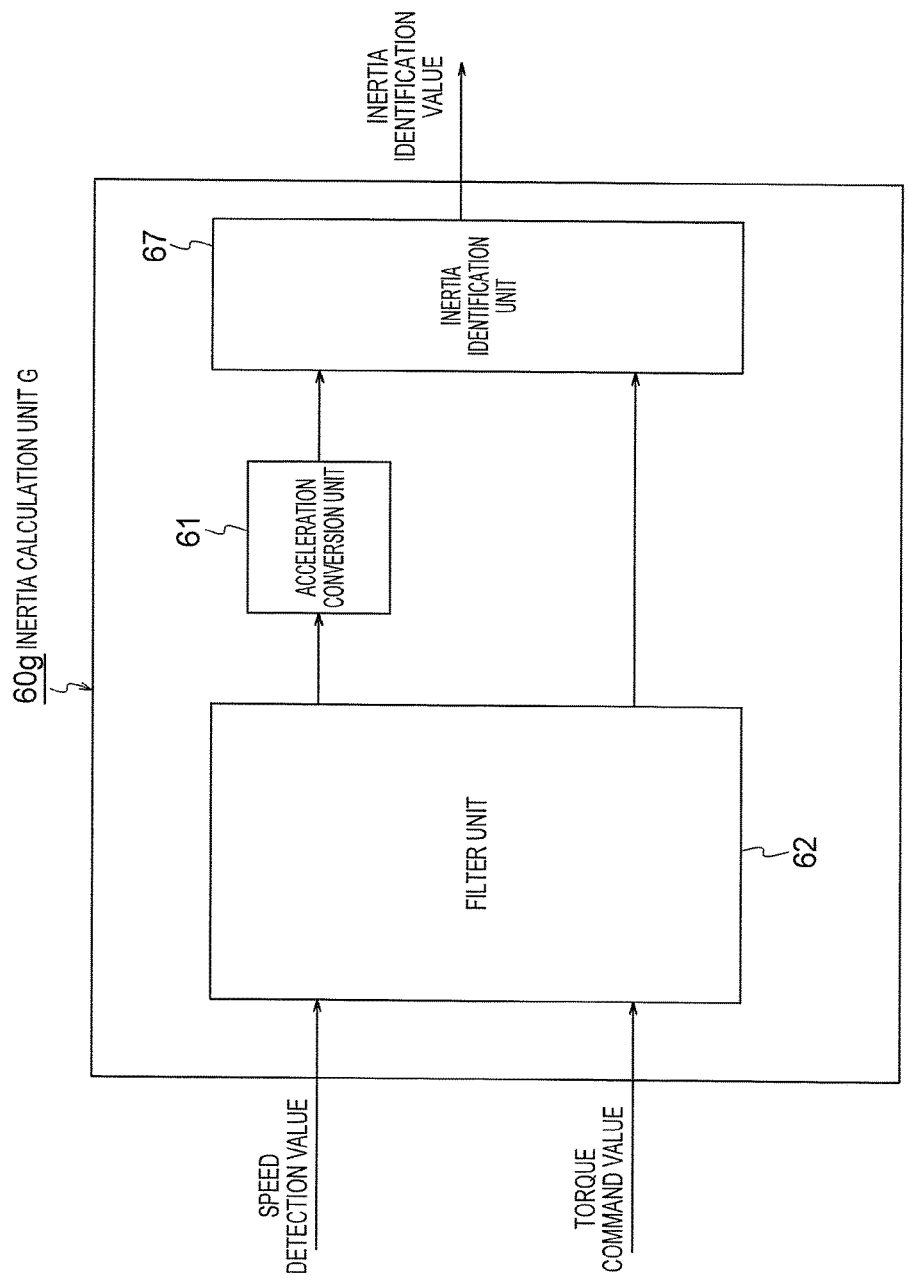
FIG. 7 is a view showing an internal configuration of an inertia calculation unit of an elevator control device according to another embodiment of this invention.

Note that FIG. 7 shows an elevator control device according to another embodiment of this invention, to be described below.

It is evident from the above that basically, the inertia identification value, or in other words the inertia J, can be determined on the basis of Expression (10) or Expression (11).

In Expression (10) or Expression (11), when the denominator, or in other words the value of the filtered acceleration detection value, reaches zero, division by zero occurs, and this is problematic.

In an actual elevator control device, therefore, it is necessary to employ an inertia identification method that solves the problem of division by zero.

Hence, an effective inertia identification method (identification algorithm) for solving the problem of division by zero will be described below.

First, using Expression (6) as a reference, H1 (dω/dt) and H1 (T) may be plotted respectively as abscissa data and ordinate data constituting two-dimensional data. Further, these two-dimensional data may be gathered in a large amount from an actual working elevator system and plotted. Referring to Expression (6), it is evident at this time that the inertia J corresponds to the incline of a straight line obtained when a linear approximation of the plotted two-dimensional data is made. Therefore, the incline of a straight line obtained when a linear approximation of a data group is made by applying the method of least squares thereto may be determined, and the value of the incline may be set as the identification value of the inertia J.

Note that this line of thinking in relation to Expression (6) may be applied similarly to Expression (7).

By determining the inertia J on the basis of this line of thinking, the problem (the problem of division by zero) that arises when the denominator of Expression (10) or Expression (11) reaches zero can be avoided.

In this method of gathering a large amount of two-dimensional data from an actual working elevator system, making a linear approximation of the gathered two-dimensional data by applying the method of least squares, and setting the incline of the straight line obtained at this time as the inertia J, the data are accumulated and the method of least squares is applied once to the accumulated data as a whole. Hence, this method will be referred to as a method of identifying the inertia J by applying a one-time method of least squares.

In contrast to the one-time method of least squares, however, the inertia J may be determined while gathering the two-dimensional data from an actual working elevator system and simultaneously applying the method of least squares thereto successively. This method is a method of determining the inertia J by applying a successive method of least squares.

The method of identifying the inertia J by applying the successive method of least squares will now be described.

Specifically, in this identification method, the inertia identification unit 67 determines the inertia J (more accurately, J[n]) by calculating a recurrence relation of J[n], as shown below.

$$J[n]=J[n-1]+\mu \times a[n] \times (t[n]-J[n-1] \times a[n]) \quad (12)$$

Here, a[n] denotes data obtained by implementing BPF (band pass filter #1) processing on motor angular acceleration data generated during travel, t[n] denotes data obtained by implementing BPF (band pass filter #2) processing on torque command value (torque waveform) data generated during travel, and J[n] denotes the inertia identification value.

Note that here, the data obtained by implementing BPF (band pass filter) processing are data that have been passed through the BPF (the band pass filter).

Further, the band pass filters #1 and #2 have identical frequency characteristics.

Note that n is a natural number.

Further, μ is a constant (an identification constant) used to adjust a convergence speed of the identification value.

Hence, the inertia identification unit 67 shown in FIG. 4 is realized by digital computation representing the recurrence relation of J[n] shown in Expression (12). Similarly, the acceleration conversion unit 61 shown in FIG. 4 is realized by digital computation in which a differential operation is performed.

Accordingly, the specific calculation processing shown in FIG. 4 is implemented in the interior of the inertia calculation unit 60.

Note that in Expression (12), the identification value of the inertia J must be confirmed on the basis of the successively obtained value of J[n]. This is realized by the determination unit A 69a.

The determination unit A 69a determines whether or not the inertia identification value calculated by the inertia calculation unit 60 is an appropriate value, and then confirms and outputs the appropriate inertia identification value as the identification value of the inertia J.

More specifically, the determination as to whether or not the inertia identification value calculated by the inertia calculation unit 60 is an appropriate value is made by confirming the degree of convergence of the inertia identification value calculated by the inertia calculation unit 60.

Hence, a method of determining an appropriate inertia identification value on the basis of the degree of convergence of the inertia identification value will be described below using FIG. 5, which shows the temporal waveform of the inertia identifying speed command value.

As noted above, the circle marks in FIG. 5 denote the timings at which the inertia identification value calculated by the inertia calculation unit 60 is stored in the storage unit, not shown in the drawing, and the simultaneous timings at which convergence is determined by applying the convergence determination expression shown in Expression (13), to be described below. In other words, at each of the timings indicated by the circle marks, J[n] is stored and the degree of convergence thereof is confirmed.

In FIG. 5, the inertia identifying speed command value is configured such that two speed values having different magnitudes alternate every 3.0 sec, and therefore the inertia identification value is stored, and the degree of convergence thereof is confirmed, at intervals of the same length, i.e. every 3.0 sec.

In FIG. 5, a period in which the inertia identification unit 67 successively calculates the inertia identification value is set at 5.0 msec, for example, and therefore the timing interval of 3.0 sec used here is clearly considerably longer than 5.0 msec.

In actuality, when the inertia identifying speed command value shown in FIG. 5 is used, the inertia identification value varies greatly during acceleration and deceleration periods in which the speed value is switched, and converges smoothly during constant speed travel. In other words, the inertia identification value has a characteristic according to which the inertia identification value varies in steps at period intervals of 3.0 sec, at which the speed value is switched, while gradually converging. Hence, using this characteristic, the degree of convergence of the inertia identification value is confirmed and a determination is made as to whether or not the inertia identification value has converged while storing the inertia identification value at period intervals of 3.0 sec, which is considerably longer than the period of 5.0 msec at which the inertia identification value is successively calculated.

As regards a specific determination as to whether or not the inertia identification value has converged, the inertia identification value may be determined to have converged when, for example, the convergence determination expression shown below in Expression (13) is satisfied four times in a row.

Convergence Determination Expression:

$$\text{Abs}(J_k - J_{k-1}) < 0.03 \times J_{k-1} \quad (13)$$

Here, Abs ( ) is an operator used to calculate an absolute value of the numerical value in parentheses.

Further, $J_k$ denotes the inertia identification value J[n] stored at the timing indicated by a $k^{th}$ circle mark. k is a natural number, and $J_0$ may be set at a value of zero or a value set as initial value data (data applied as an initial value), for example.

In Expression (13), the inertia identification value is determined to have converged on the currently stored inertia identification value J[n] when an absolute value of a difference between the previously stored inertia identification value J[n] and the currently stored inertia identification value J[n] is smaller than a multiple of 0.03 of the previously stored J[n].

By setting the value of the inertia identification value at the point where the inertia identification value is determined to have converged as the appropriate inertia identification value, the identification value of the inertia J can be confirmed.

Having confirmed that the inertia identification value has converged, the elevator control device 1 stops applying the inertia identifying speed command value as the speed command value.

Thereafter, the elevator control device 1 starts a normal operation by switching a switch of the speed command generation unit 2 such that the normal operation speed command value is applied as the speed command value, and halts the inertia identification calculations in the interior of the inertia determination unit A 50a.

As described above in relation to the configuration of the inertia determination unit A 50a, when the normal operation starts, the control parameter setting unit A 71a sets an appropriate control parameter for the elevator control device using the appropriate inertia identification value confirmed by the determination unit A 69a of the inertia determination unit A 50a.

In other words, the elevator control device 1 realizes the normal operation by performing calculations using the control parameter set by the control parameter setting unit A 71a. Note that here, as described above, the control parameter is the gain of the PI controller 43 provided in the speed command generation unit A 40a, for example.

More specifically, the control parameter setting unit A 71a sets the value of the gain of the PI controller 43 in consideration of the inertia value confirmed by the determination unit A 69a such that the open loop transfer characteristic of the speed control system (or the control band of the speed control system) matches the design value.

In section [1] above, first, the reason why the inertia identification unit 67 shown in FIGS. 3 and 4 can determine the inertia identification value of the elevator on the basis of the acceleration torque command value and the output obtained when the acceleration detection value is input into the filter unit 62 was described with respect to the first feature of the elevator control device according to the first embodiment of this invention.

Next, in section [2] below, the reason why the precision with which the inertia is identified can be improved by employing the temporal waveform of the inertia identifying speed command value shown in FIG. 5 will be described with respect to the second feature of the elevator control device according to the first embodiment of this invention.

[2] Inertia Identification Using Inertia Identifying Speed Command Value (1) Reason 1 for Improvement in Identification Precision A case in which the identification value of the inertia J is determined on the basis of the method of least squares shown in Expression (12) using the data a[n] obtained by implementing BPF processing on the motor angular acceleration data generated during travel and the data t[n] obtained by implementing BPF processing on the travel torque data will be described below as an example.

In this case, the inertia identification method is based on the method of least squares, and it is therefore clear that basically, the precision with which the inertia J is identified can be improved steadily by increasing the amount of two-dimensional data (a[n], t[n]) combining a [n] and t[n]. As described above, the reason why this is clear is that when a large amount of the two-dimensional data (a[n], t[n]) is plotted on a two-dimensional plane having an ordinate and an abscissa, the incline of the straight line obtained when a linear approximation of the two-dimensional data is made corresponds to the inertia J.

It is necessary, however, to note that even when the amount of two-dimensional data (a[n], t[n]) is large, the precision with which the inertia J is identified cannot be improved if the values of the two-dimensional data are substantially constant.

When identifying the inertia J, therefore, it is clearly effective to employ a speed command value with which a large amount of the two-dimensional data constituted by a[n] and t[n] can be gathered at various values as the inertia identifying speed command value in order to improve the precision with which the inertia J is identified.

On the basis of this line of thinking, the elevator control device according to the first embodiment of this invention uses a speed command value such as that shown in FIG. 5, which has a temporal waveform that alternates every 3.0 sec between a first speed value and a second speed value having identical signs but different magnitudes, as the inertia identifying speed command value.

Further, the inertia identifying speed command value used herein may be understood to correspond to an identification signal that excites an elevator system in the technical field of system identification. Moreover, it is common knowledge in the technical field of system identification that when an identification signal has a temporal waveform including a large number of frequency components, rapid convergence on the correct identification value (i.e. an improvement in the identification convergence performance) can be achieved in addition to the aforesaid improvement in identification precision.

However, it is not appropriate simply to apply a speed command value that alternates between forward driving and reverse driving of a motor, for example, this speed command value being well known as an identification signal for exciting a motor system, to an elevator system that includes an elevator mechanical system.

The reason for this is that when inertia identification is implemented correctly on an elevator, the elevator system must be excited in a condition where driving force is reliably transmitted from the motor 7 to the car 15.

When a speed command value with which traction cannot be secured between the sheave 9 and the rope 11 is used, a slip phenomenon occurs between the sheave 9 and the rope 11, and as a result, the correct inertia value of the elevator, or in other words the correct inertia value of the entire elevator as seen from the motor 7, cannot be obtained.

It is therefore necessary to be aware of the following point when employing the inertia identifying speed command value according to the first embodiment of this invention, which has a temporal waveform that alternates between a first speed value and a second speed value having identical signs but different magnitudes.

The first speed value and the second speed value of the inertia identifying speed command value must be set at values that have respectively been adjusted to appropriate magnitudes so as to avoid the aforesaid slip phenomenon between the sheave and the rope. In so doing, inertia identification can be performed reliably in a condition where driving force is transmitted reliably from the motor to the car.

As described above in section (1), it is clear that in the first embodiment of this invention, the identification precision and the identification convergence performance can be improved by employing the temporal waveform shown in FIG. 5 as the inertia identifying speed command value.

(2) Reason 2 for Improvement in Identification Precision

In the inertia identifying speed command value shown in FIG. 5, the first speed value and the second speed value can both be reduced as long as inertia identification is implemented favorably, and therefore the first and second speed values can be set at approximately one hundredth, for example, of the actual speed of the car during normal travel. When an inertia identifying speed command value having first and second speed values with magnitudes adjusted in this manner is used, an amount by which the car moves between the start and the end of the inertia identification calculations is smaller than with the conventional elevator control device. When the movement amount of the car is small, the amount by which the rope imbalance varies while the car moves between the start and the end of the inertia identification calculations is also small. Therefore, when the inertia identifying speed command value described here is employed, the effect of the rope imbalance on the signals (the torque command value, for example) used during inertia identification can be reduced.

It is therefore clear that by employing an inertia identifying speed command value having first and second speed values with adjusted magnitudes, the effect of the rope imbalance is less likely to appear in the inertia identification result.

The content of sections (1) and (2) may be summarized as follows.

With the inertia identifying speed command value shown in FIG. 5, a large amount of the two-dimensional data (a[n], t[n]) can be gathered at various values when identifying the inertia J, and therefore inertia identification can be achieved with a high degree of identification precision and a superior identification convergence performance.

Furthermore, by appropriately adjusting the magnitude of the speed command value relative to the normal travel speed of the car, the effect of the rope imbalance on the inertia identification operation can be reduced, and as a result, inertia identification can be achieved with an even higher degree of identification precision.

The configuration of the elevator control device according to the first embodiment of this invention was described above in order to clarify the relationship of the two features serving as the main configuration to the inertia identification operation serving as the core part of the elevator control device.

An operation of the elevator control device according to the first embodiment of this invention will be described briefly below using FIGS. 1 to 5. Note that some parts already described will be repeated.

To identify the inertia value, first, as shown in FIG. 1, the car 15 is stopped on a certain floor, whereupon the inertia identifying speed command value shown in FIG. 5 is input into the speed control unit A 3a as the speed command value generated by the speed command generation unit 2 and the speed control unit A 3a applies the torque command value to the motor 7 via the torque control unit 5. As a result, the motor 7 is driven, whereby the car 15 is caused to travel. The speed detection unit 20 determines the speed detection value via the differentiator 19 by detecting the position detection value of the motor 7 using the encoder 8, and inputs the speed detection value into the speed control unit A 3a.

Next, an operation of the speed control unit A 3a will be described using FIG. 2. The second subtractor 41a subtracts the speed detection value from the speed command value, and using the subtraction result, sets the value determined by the PI controller 43 through PI control as the torque command value.

Next, an operation of the inertia determination unit A 50a will be described using FIGS. 2, 3, and 4.

In the interior of the inertia determination unit A 50a, the inertia calculation unit 60 determines the inertia identification value using the speed detection value and the torque command value. In the inertia calculation unit F 60f serving as a specific example of the inertia calculation unit 60, the inertia identification unit 67 calculates the inertia identification value of the elevator on the basis of the recurrence relation shown in Expression (12) using the output of the filter unit 62, which has a frequency characteristic with which the direct current component and the torque component derived from the rope imbalance can be removed from the temporal waveform of the torque command value.

The determination unit A 69a of the inertia determination unit A 50a determines whether or not the inertia identification value determined by the inertia calculation unit 60, or in other words the inertia identification value calculated by the inertia calculation unit F 60f serving as a specific example of the inertia calculation unit 60, is an appropriate value while confirming the degree of convergence of the inertia identification value, confirms the inertia identification value at the point where convergence is determined to have been achieved as the appropriate inertia identification value, and outputs the appropriate inertia identification value. As regards a specific determination as to whether or not the inertia identification value has converged, the inertia identification value may be determined to have converged when, for example, the convergence determination expression shown in Expression (13) is satisfied four times in a row.

Next, the control parameter setting unit A 71a of the inertia determination unit A 50a sets the control parameter of the control device using the inertia identification value confirmed by the determination unit A 69a to be appropriate. Here, the control parameter is the gain of the PI controller 43 provided in the torque command generation unit A 40a.

Having confirmed that the inertia identification value has converged, the elevator control device 1 stops applying the inertia identifying speed command value as the speed command value, and starts a normal operation by switching the switch of the speed command generation unit 2 such that the normal operation speed command value is applied as the speed command value. During the normal operation, the elevator control device 1 halts the inertia identification calculations in the interior of the inertia determination unit A 50a.

At the start of the normal operation, the control parameter setting unit A 71a sets the control parameter of the elevator control device appropriately using the inertia identification value confirmed by the determination unit A 69a of the inertia determination unit A 50a.

Once the inertia identification operation is complete, the elevator control device 1 executes normal operations by performing calculations using the control parameter set by the control parameter setting unit A 71a.

As described above, the elevator control device according to the first embodiment of this invention includes, as featured configurations, the filtering means for removing the direct current component and the torque component derived from the rope imbalance from the torque command value applied to the motor, and the inertia identifying means for identifying the inertia value of the elevator on the basis of the output obtained when the speed detection signal is input into the filtering means and the acceleration converting means, which are connected in series, and the output obtained when the torque command value is input into the filtering means.

With the elevator control device according to the first embodiment of this invention, the effect of the rope imbalance can be removed effectively when identifying the inertia value of the elevator, and as a result, the inertia value can be calculated accurately even in a high-lift elevator in which problems occur due to the rope imbalance.

In the elevator control device according to the first embodiment of this invention, when the inertia is identified using a speed command value featuring a temporal waveform that alternates between a first speed value and a second speed value having identical signs but different magnitudes as the inertia identifying speed command value, inertia identification can be achieved with a high degree of identification precision and a superior identification convergence performance even in a high-lift elevator in which problems occur due to the rope imbalance.

Second Embodiment

FIGS. 1 and 3 to 6 pertain to a second embodiment of this invention.

First, a configuration of an elevator control device according to the second embodiment of this invention will be described.

FIGS. 1 and 3 to 5 are as described above in the first embodiment of this invention.

Accordingly, the configuration of the elevator control device according to the second embodiment of this invention will be described mainly using FIG. 6.

In the first embodiment of this invention, the speed control unit 3 shown in FIG. 1 corresponds to the speed control unit A 3a having the internal configuration shown in FIG. 2. In the second embodiment of this invention, the speed control unit 3 shown in FIG. 1 corresponds to a speed control unit B 3b having an internal configuration shown in FIG. 6.

In other words, the elevator control device according to the second embodiment of this invention uses the speed control unit B 3b in place of the speed control unit A 3a of the elevator control device according to the first embodiment of this invention.

The respective speed control units A 3a and B 3b according to the first and second embodiments of this invention may be compared in further detail as follows.

As shown in FIG. 2, the speed control unit A 3a of the elevator control device according to the first embodiment of this invention realizes a speed feedback control system by means of the PI controller 43 serving as the torque command generation unit A 40a.

Figure 6:
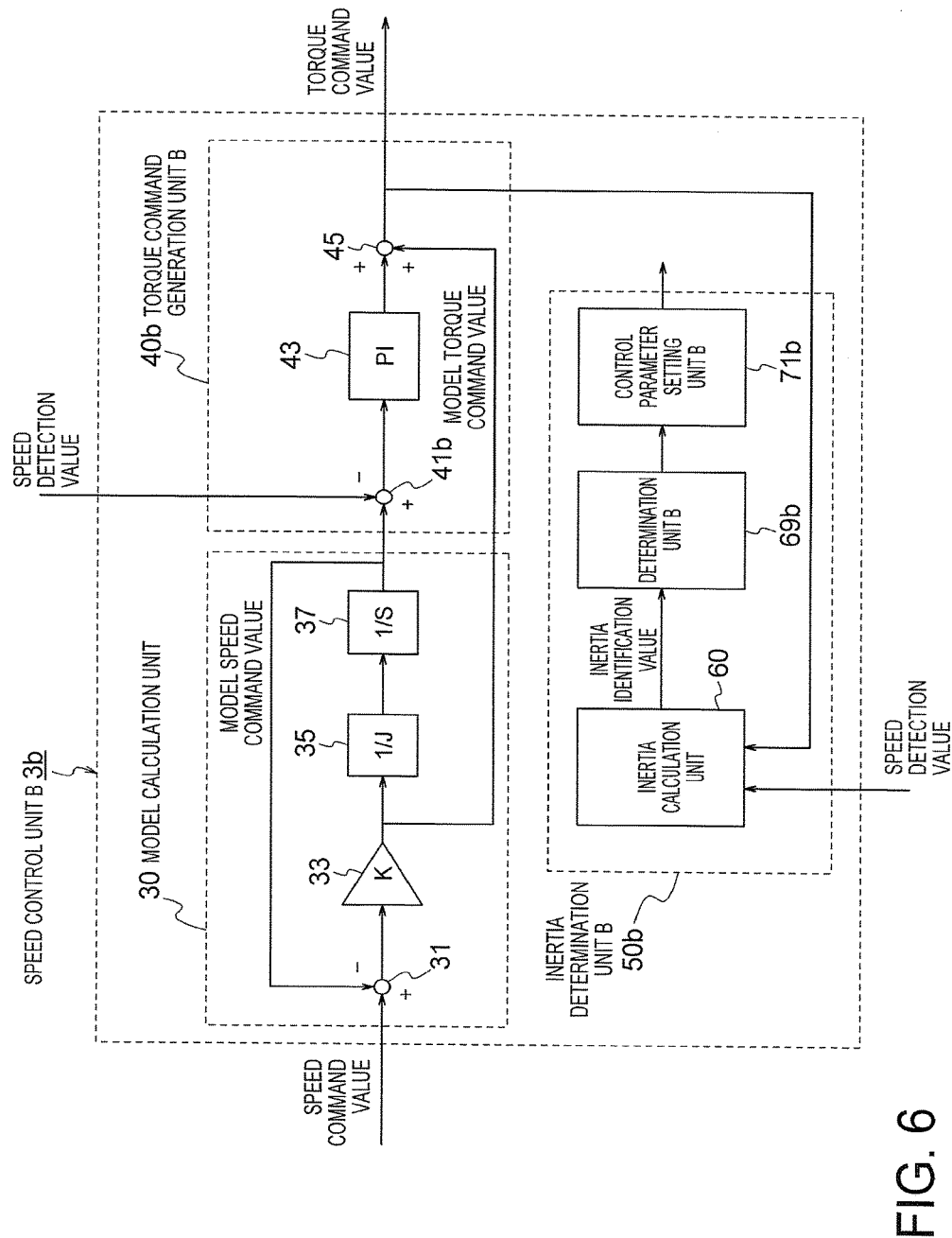
FIG. 6 is a view showing an internal configuration of a speed control unit of the elevator control device according to the second embodiment of this invention.

As shown in FIG. 6, on the other hand, the speed control unit B 3b of the elevator control device according to the second embodiment of this invention further includes a model calculation unit 30, and therefore realizes a two-degree-of-freedom control system constituted by a speed feedforward control system and a speed feedback control system using a model speed command value and a model torque command value generated by the model calculation unit 30.

Hence, the elevator control device according to the second embodiment of this invention is a specific example of a two-degree-of-freedom control system, and therefore, by setting the control parameter appropriately, the advantages of a two-degree-of-freedom control system, namely superior characteristics in terms of the ability of the speed value to follow the speed command value and the ability to suppress disturbances in the system, can be obtained.

In FIG. 6, the speed control unit B 3b includes the model calculation unit 30, a torque command generation unit B 40b, and an inertia determination unit B 50b.

The model calculation unit 30 includes a first subtractor 31, a control unit 33, an inertia unit 35, and an integrator 37. The first subtractor 31 determines a first speed deviation value by subtracting the model speed command value from the speed command value. The control unit 33 determines the model torque command value using the speed deviation value as input. The inertia unit 35 determines a model acceleration command value (a result of differentiating the model speed command value) using the model torque command value as input, and uses 1/J as a transfer function. The integrator 37 determines the model speed command value using the model acceleration command value as input.

The model calculation unit 30 then determines a model speed command value and a model torque command value that serve respectively as models of the speed command value and the torque command value by calculating the model speed command value and the model torque command value such that the model speed command value follows the speed command value.

The torque command generation unit B 40b includes a second subtractor B 41b, the PI controller 43, and a first adder 45. The second subtractor B 41b determines a second speed deviation value by subtracting the speed detection value from the model speed command value. The PI controller 43 implements PI control on the basis of the second speed deviation value. The first adder 45 determines the torque command value by adding the model torque command value to the value calculated by the PI controller.

The torque command generation unit B 40b then generates the torque command value using a deviation between the model speed command value and the speed command value as input.

The inertia determination unit B 50b includes the inertia calculation unit 60, a determination unit B 69b, and a control parameter setting unit B 71b. The inertia calculation unit 60 determines the inertia identification value using the speed detection value and the torque command value as input. The determination unit B 69b determines whether or not the inertia identification value is an appropriate value, and confirms and outputs the appropriate inertia identification value. The control parameter setting unit B 71b sets control parameters of the control device using the appropriate inertia value confirmed by the determination unit B 69b.

The elevator control device 1 performs calculations using the control parameters set by the control parameter setting unit B 71b. Here, the control parameters are the gain of the PI controller 43 provided in the torque command generation unit B 40b and a parameter of the inertia unit 35 provided in the model calculation unit 30 (see FIG. 6). Note that the gain of the PI controller 43 is set in consideration of the appropriate inertia value obtained by the determination unit B 69b so that the open loop transfer characteristic of the speed control system (or the control band of the speed control system), for example, matches a design value. Further, a gain characteristic of the inertia unit 35 of the model calculation unit 30 is 1/J, and therefore the parameter thereof may be set as the inverse of the inertia identification value confirmed by the determination unit B 69b.

An operation of the elevator control device according to the second embodiment of this invention, configured as described above, will now be described using FIGS. 1 and 3 to 6.

To identify the inertia value, first, as shown in FIG. 1, the car 15 is stopped on a certain floor, whereupon the inertia identifying speed command value shown in FIG. 5 is input into the speed control unit B 3b as the speed command value generated by the speed command generation unit 2 and the speed control unit B 3b applies the torque command value to the motor 7 via the torque control unit 5. As a result, the motor 7 is driven, whereby the car 15 is caused to travel. The speed detection unit 20 determines the speed detection value via the differentiator 19 by detecting the position detection value of the motor 7 using the encoder 8, and inputs the speed detection value into the speed control unit B 3b.

Next, an operation of the speed control unit B 3b will be described using FIG. 6.

The model calculation unit 30 operates as follows.

The first subtractor 31 determines the first speed deviation value by subtracting the model speed command value from the speed command value. The control unit 33 then determines the model torque command value using the first speed deviation value. Next, the inertia unit 35 determines the model acceleration command value using the model torque command value. The integrator 37 then determines the model speed command value using the model acceleration command value.

Further, the torque command generation unit B 40b operates as follows.

The second subtractor 41b determines the second speed deviation value by subtracting the speed detection value from the model speed command value. The first adder 45 then determines the torque command value by adding the model torque command value to the value determined by the PT controller 43 through PT control using the second speed deviation value.

Hence, when the speed control unit B 3b according to the second embodiment of this invention is used, the inertia identifying speed command value shown in FIG. 5 is input into the torque command generation unit B 40b as a model speed command value after being smoothed via the model calculation unit 30.

Therefore, when the speed control unit B 3b is used, rapid variation in the speed of the motor 7 is less likely to occur than when the speed control unit A 3a according to the first embodiment of this invention, with which the inertia identifying speed command value is input as is, is used. Accordingly, a slip phenomenon less likely to occur between the sheave 9 and the rope 11, and as a result, the correct inertia value of the elevator, or in other words the correct inertia value of the entire elevator as seen from the motor 7, can be obtained.

Next, an operation of the inertia determination unit B 50b will be described using FIG. 6.

In the interior of the inertia determination unit B 50b, the inertia calculation unit 60 determines the inertia identification value using the speed detection value and the torque command value. In the inertia calculation unit F 60f serving as a specific example of the inertia calculation unit 60, the inertia identification unit 67 calculates the inertia identification value of the elevator on the basis of the recurrence relation shown in Expression (12) using the output of the filter unit 62, which has a frequency characteristic with which the direct current component and the torque component derived from the rope imbalance can be removed from the temporal waveform of the torque command value.

The determination unit B 69b of the inertia determination unit B 50b determines whether or not the inertia identification value determined by the inertia calculation unit 60, or in other words the inertia identification value calculated by the inertia calculation unit F 60f serving as a specific example of the inertia calculation unit 60, is an appropriate value while confirming the degree of convergence of the inertia identification value, confirms the inertia identification value at the point where convergence is determined to have been achieved as the appropriate inertia identification value, and outputs the appropriate inertia identification value. As regards a specific determination as to whether or not the inertia identification value has converged, the inertia identification value may be determined to have converged when, for example, the convergence determination expression shown in Expression (13) is satisfied four times in a row.

Next, the control parameter setting unit B 71b of the inertia determination unit B 50b sets the control parameters of the control device using the inertia identification value confirmed by the determination unit B 69b to be appropriate. Here, the control parameters are the gain of the PI controller 43 provided in the torque command generation unit B 40b and the parameter of the inertia unit 35 provided in the model calculation unit 30.

More specifically, the gain of the PI controller 43 is set in consideration of the appropriate inertia identification value confirmed by the determination unit B 69b so that the open loop transfer characteristic of the speed control system (or the control band of the speed control system), for example, matches the design value. Further, the gain characteristic of the inertia unit 35 of the model calculation unit 30 is 1/J, and therefore the parameter thereof may be set as the inverse of the obtained inertia identification value.

Having confirmed that the inertia identification value has converged, the elevator control device 1 stops applying the inertia identifying speed command value as the speed command value, and starts a normal operation by switching the switch of the speed command generation unit 2 such that the normal operation speed command value is applied as the speed command value. During the normal operation, the inertia identification calculations performed in the interior of the inertia determination unit B 50b are halted.

At the start of the normal operation, the control parameter setting unit B 71b sets the control parameters of the elevator control device appropriately using the inertia identification value confirmed by the determination unit B 69b of the inertia determination unit B 50b.

Once the inertia identification operation is complete, the elevator control device 1 executes normal operations by performing calculations using the control parameter set by the control parameter setting unit B 71*b*.

Note that the content of the operation implemented by the inertia calculation unit F 60*f* serving as a specific example of the inertia calculation unit 60 shown in FIG. 3 is similar to that described in the first embodiment of this invention.

The elevator control device according to the second embodiment of this invention is obtained by configuring the elevator control device according to the first embodiment of this invention so as to include the model calculation unit as model calculating means for determining the model speed command value and the model torque command value serving respectively as models of the speed command value and the torque command value by calculating the model speed command value and the model torque command value such that the model speed command value follows the temporal waveform of the speed command value, and such that the torque command generation unit serving as the torque command generating means generates, as the torque command value, a value obtained by adding the model torque command value to a value calculated on the basis of the difference between the model speed command value and the speed detection value.

Hence, with the elevator control device according to the second embodiment of this invention, similarly to the elevator control device according to the first embodiment of this invention, the effect of the rope imbalance can be removed effectively when identifying the inertia value of the elevator, with the result that the inertia value can be identified accurately even in a high-lift elevator in which problems occur due to the rope imbalance.

Further, the elevator control device according to the second embodiment of this invention is a specific example of a two-degree-of-freedom control system, and therefore, by setting the control parameters appropriately using the accurate inertia value, the advantages of a two-degree-of-freedom control system, namely superior characteristics in terms of the ability of the speed value to follow the speed command value and the ability to suppress disturbances in the system, can be obtained over the first embodiment of this invention.

Furthermore, in the elevator control device according to the second embodiment of this invention, similarly to the elevator control device according to the first embodiment of this invention, when the inertia is identified using a speed command value featuring a temporal waveform that alternates between a first speed value and a second speed value having identical signs but different magnitudes as the inertia identifying speed command value, inertia identification can be achieved with a high degree of identification precision and a superior identification convergence performance even in a high-lift elevator in which problems occur due to the rope imbalance.

Moreover, in the elevator control device according to the second embodiment of this invention, the inertia identifying speed command value is input into the torque command generation unit B 40*b* as the model speed command value after being smoothed via the model calculation unit 30, and therefore rapid variation in the speed of the motor is less likely to occur than with the elevator control device according to the first embodiment of this invention, in which the inertia identifying speed command value is input as is. Accordingly, a slip phenomenon is less likely to occur between the sheave and the rope, and as a result, the correct inertia value of the elevator, or in other words the correct inertia value of the entire elevator as seen from the motor, can be obtained.

Other Embodiment

FIG. 7 is a view showing an internal configuration of an inertia calculation unit of an elevator control device according to another embodiment of this invention.

FIG. 3, as described above in the first and second embodiments of this invention, is a view showing the internal configuration of the inertia calculation unit of the elevator control devices according to the first and second embodiments of this invention. FIG. 7, meanwhile, shows a configuration in which respective locations of the acceleration conversion unit 61 and the filter unit 62 in FIG. 3 have been switched.

As described in the first embodiment of this invention, the elevator control device is assumed to be a linear system, and it is therefore clear that similar effects to those of the elevator control devices according to the first and second embodiments of this invention, which employ the inertia calculation unit F 60*f* shown in FIG. 3, can be obtained likewise with the elevator control device according to this other embodiment of the invention, which employs an inertia calculation unit G 60*g* shown in FIG. 7.

INDUSTRIAL APPLICABILITY

As described above, the elevator control device according to this invention can be used in a system that identifies an inertia value accurately even in relation to a high-lift elevator in which problems occur due to rope imbalance.

REFERENCE SIGNS LIST

1 Elevator control device
2 Speed command generation unit
3 Speed control unit having inertia identification function (3*a*: speed control unit A, 3*b*: speed control unit B)
5 Torque control unit
7 Motor
8 Encoder
9 Sheave
11 Rope
13 Counter weight
15 Car
19 Differentiator
20 Speed detection unit
30 Model calculation unit
31 First subtractor
33 Control unit
35 Inertia unit
37 Integrator
40 Torque command generation unit (40*a*: torque command generation unit A, 40*b*: torque command generation unit B)
41 Second subtractor (41*a*: second subtractor A, 41*b*: second subtractor B)
43 PI controller
45 First adder
50 Inertia determination unit (50*a*: inertia determination unit A, 50*b*: inertia determination unit B)
60 Inertia calculation unit (60*f*: inertia calculation unit F, 60*g*: inertia calculation unit G)
61 Acceleration conversion unit
62 Filter unit
67 Inertia identification unit
69 Determination unit (69*a*: determination unit A, 69*b*: determination unit B)
71 Control parameter setting unit (71*a*: control parameter setting unit A, 71*b*: control parameter setting unit B)

The invention claimed is:

1. An elevator control device comprising:
a motor that generates torque for causing a car of an elevator to ascend and descend;
speed command generating means for generating a speed command value of the motor;
speed detecting means for detecting a detected speed value of the motor;
torque command generating means for generating a torque command value on the basis of the speed command value and the detected speed value;
torque controlling means for controlling the motor so that a value of the torque generated by the motor matches the torque command value; and
inertia calculating means for calculating an inertia value of the elevator on the basis of the torque command value and the speed value detected by the speed detecting means,
the inertia calculating means including:
filtering means for removing a direct current component and a torque component derived from rope imbalance from a temporal waveform of the torque command value;
acceleration converting means for converting a temporal waveform having a speed dimension into a temporal waveform having an acceleration dimension; and
inertia identifying means for identifying the inertia value of the elevator on the basis of an output obtained when a temporal waveform of the speed value detected by the speed detecting means is input into the acceleration converting means and the filtering means, which are connected in series, and an output obtained when the temporal waveform of the torque command value is input into the filtering means.

2. The elevator control device according to claim 1, further comprising model calculating means for determining a model speed command value and a model torque command value that serve respectively as models of the speed command value and the torque command value by calculating the model speed command value and the model torque command value such that the model speed command value follows a temporal waveform of the speed command value,
wherein the torque command generating means generates, as the torque command value, a value obtained by adding the model torque command value to a value calculated on the basis of a difference between the model speed command value and the speed detection value.

3. The elevator control device according to claim 1, wherein a temporal waveform of the speed command value has a temporal waveform that alternates between a first speed value and a second speed value having identical signs but different magnitudes.

4. The elevator control device according to claim 2, wherein a temporal waveform of the speed command value has a temporal waveform that alternates between a first speed value and a second speed value having identical signs but different magnitudes.

5. An elevator control device comprising:
a motor that generates torque for causing a car of an elevator to ascend and descend;
circuitry configured to
generate a speed command value of the motor;
detect a detected speed value of the motor;
generate a torque command value on the basis of the speed command value and the detected speed value;
control the motor so that a value of the torque generated by the motor matches the torque command value; and
calculate an inertia value of the elevator on the basis of the torque command value and the detected speed value,
the circuitry further configured to perform as
a filter that removes a direct current component and a torque component derived from rope imbalance from a temporal waveform of the torque command value;
an acceleration converter that converts a temporal waveform having a speed dimension into a temporal waveform having an acceleration dimension; and
an inertia identifier that identifies the inertia value of the elevator on the basis of an output obtained when a temporal waveform of the detected speed value is input into the acceleration converter and the filter, which are connected in series, and an output obtained when the temporal waveform of the torque command value is input into the filter.

6. The elevator control device according to claim 5, further comprising circuitry configured to
determine a model speed command value and a model torque command value that serve respectively as models of the speed command value and the torque command value by calculating the model speed command value and the model torque command value such that the model speed command value follows a temporal waveform of the speed command value,
wherein the circuitry is further configured to generate, as the torque command value, a value obtained by adding the model torque command value to a value calculated on the basis of a difference between the model speed command value and the detected speed value.

7. The elevator control device according to claim 5, wherein a temporal waveform of the speed command value has a temporal waveform that alternates between a first speed value and a second speed value having identical signs but different magnitudes.

8. The elevator control device according to claim 6, wherein a temporal waveform of the speed command value has a temporal waveform that alternates between a first speed value and a second speed value having identical signs but different magnitudes.

9. A method of operating an elevator comprising:
generating torque, using a motor, that causes a car of the elevator to ascend and descend;
generating a speed command value of the motor;
detecting a detected speed value of the motor;
generating a torque command value on the basis of the speed command value and the detected speed value;
controlling the motor so that a value of the torque generated by the motor matches the torque command value;
calculating an inertia value of the elevator on the basis of the torque command value and the detected speed value;
filtering to remove a direct current component and a torque component derived from rope imbalance from a temporal waveform of the torque command value;
converting a temporal waveform having a speed dimension into a temporal waveform having an acceleration dimension; and
identifying the inertia value of the elevator on the basis of an output obtained when a temporal waveform of the detected speed value is converted by the converting and filtered by the filtering, and an output obtained when the temporal waveform of the torque command value is filtered by the filtering.

10. The method according to claim 9, further comprising:
determining a model speed command value and a model torque command value that serve respectively as models of the speed command value and the torque command value by calculating the model speed command value and the model torque command value such that the model speed command value follows a temporal waveform of the speed command value; and
generating, as the torque command value, a value obtained by adding the model torque command value to a value calculated on the basis of a difference between the model speed command value and the detected speed value.

11. The method according to claim 9, wherein a temporal waveform of the speed command value has a temporal waveform that alternates between a first speed value and a second speed value having identical signs but different magnitudes.

12. The method according to claim 10, wherein a temporal waveform of the speed command value has a temporal waveform that alternates between a first speed value and a second speed value having identical signs but different magnitudes.

* * * * *